April 22, 1969 R. B. RILEY 3,440,538
PUSH-PULL METER CIRCUIT FOR PRODUCING DIRECT-CURRENT AND ALTERNATING-CURRENT OUTPUTS PROPORTIONAL TO APPLIED ALTERNATING SIGNAL
Filed Oct. 29, 1965
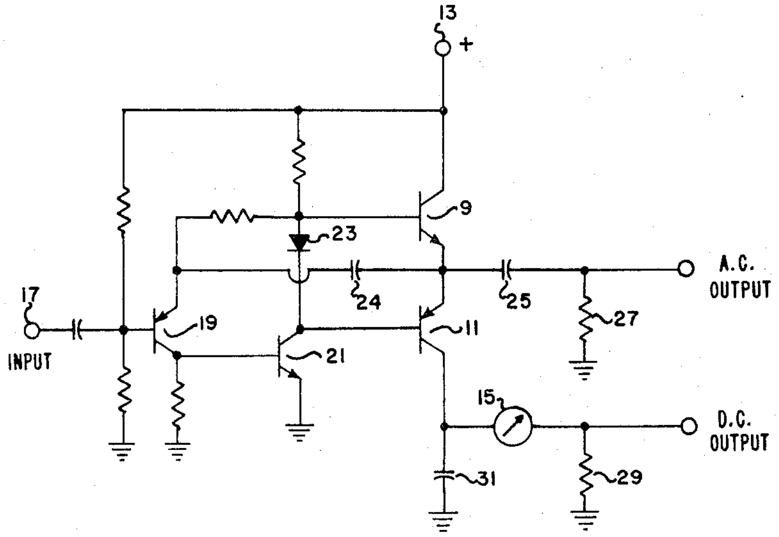
INVENTOR
RUSSELL B. RILEY
BY A. C. Smith
ATTORNEY

United States Patent Office 3,440,538
Patented Apr. 22, 1969

3,440,538

PUSH-PULL METER CIRCUIT FOR PRODUCING DIRECT-CURRENT AND ALTERNATING-CURRENT OUTPUTS PROPORTIONAL TO APPLIED ALTERNATING SIGNAL

Russell B. Riley, Palo Alto, Calif., assignor to Hewlett-Packard Company, Palo Alto, Calif., a corporation of California Filed Oct. 29, 1965, Ser. No. 505,686
Int. Cl. G01 *1/30*; H03f *3/68*
U.S. Cl. 324—123 2 Claims

ABSTRACT OF THE DISCLOSURE

A meter circuit includes a pair of complementary conductivity type transistors connected in a circuit which produces a D.C. output, an A.C. output and a meter indication proportional to the amplitude of an applied signal.

This is accomplished in accordance with the illustrated embodiment of the present invention by operating a pair of complementary conductivity transistors as emitter followers into a load including a storage element such as a coupling capacitor and by connecting a meter in the collector circuit of one of the transistors.

Referring to the drawing, which shows a schematic diagram of the circuit of the present invention, a pair of complementary conductivity type transistors 9, 11 are connected to operate as normally cut off emitter followers. Thus, no bias current flows in the circuit from supply terminal 13 through the emitter-collector paths of transistors 9, 11 and through meter 15 to ground in the absence of signal applied to input terminal 17.

Input signal at terminal 17 is amplified by stages 19, 21 and is applied in in-phase relationship to the base electrodes of the emitter follower transistors 9, 11. Diode 23 is forward biased to provide a fixed biasing signal between the base electrodes of transistors 9, 11. The feedback path including capacitor 24 connected between the common emitters of transistors 9, 11 and the emitter of stage 19 determines the overall gain from input 17 to A.C. output and may be designed as shown to provide unity overall gain. Positive half cycles of the amplified input signal cut off transistor 11 and render transistor 9 conductive. This causes current to flow through transistor 9 from supply terminal 13 and through the capacitor storage element 25 and resistor 27 to ground, thereby charging capacitor 25 and providing positive half cycles of signal at the A.C. output. Negative half cycles of the amplified input signal cut off transistor 9 and render transistor 11 conductive. Charge from capacitor 25 thus flows through transistor 11 and meter 15 and through resistor 29 to provide a meter indication and a D.C. output across resistor 29 which are related to the input signal amplitude. The resulting current through resistor 27 thus provides the negative half cycles of signal at the A.C. output.

Capacitor 31 averages the half cycle current flow through transistor 11. This capacitor charges up during conduction of transistor 11 and discharges through meter 15 and resistor 29 during alternate half cycles of input signal. The signals on the A.C. and D.C. outputs and the indication on meter 15 are thus all related to the amplitude of the input signal applied to input terminal 17.

I claim:

1. A signal circuit comprising:
a pair of complementary conductivity type transistors, each having base, collector and emitter electrodes;
means direct-current connecting the emitter electrodes of said transistors to a common terminal;
means connected to the base electrodes of said transistors for applying signals thereto in in-phase relationship;
bias means for said transistors having a pair of terminals;
circuit means including a storage element connected between said common terminal and a terminal of said bias means;
indicating means connected between the collector electrode of one of said transistors and a terminal of said bias means; and
means connecting the collector electrode of the other of said transistors to another terminal of said bias means for supplying current to said transistors.

2. A circuit as in claim 1 wherein:
said circuit means includes a first resistor and a first capacitor connected in series circuit between said common terminal and a terminal of said bias means;
said indicating means includes a meter and a second resistor connected in series circuit between the collector electrode of one of said transistors and a terminal of said bias means; and
a second capacitor is connected in shunt with the last-named series circuit, whereby an A.C. output is derived across said first resistor and a D.C. output is derived across said second resistor.

References Cited

UNITED STATES PATENTS

| | | | |
|---|---|---|---|
| 2,844,719 | 7/1958 | Rieke et al. | 329—109 |
| 2,955,257 | 10/1960 | Lindsay | 330—13 |
| 2,955,258 | 10/1960 | Wheatley et al. | 330—13 |
| 3,048,789 | 8/1962 | Herzog | 329—107 |
| 3,079,565 | 2/1963 | Offner | 324—123 XR |
| 3,231,827 | 1/1966 | Legler | 330—13 |
| 3,337,862 | 8/1967 | Croft et al. | 330—13 XR |

OTHER REFERENCES

Electronic Design, Nov. 25, 1959, pages 25 and 26.

RUDOLPH V. ROLINEC, *Primary Examiner.*

E. F. KARLSEN, *Assistant Examiner.*

U.S. Cl. X.R.

330—13